(12) United States Patent
Tsukamoto et al.

(10) Patent No.: US 8,250,387 B2
(45) Date of Patent: Aug. 21, 2012

(54) COMPUTERS HAVING A BIOMETRIC AUTHENTICATION DEVICE

(75) Inventors: Yasumichi Tsukamoto, Yamato (JP);
Mitsuhiro Yamazaki, Yokohama (JP);
Masayasu Goto, Yamato (JP)

(73) Assignee: Lenovo (Singapore) Pte. Ltd. (SG)

( * ) Notice: Subject to any disclaimer, the term of this patent is extended or adjusted under 35 U.S.C. 154(b) by 385 days.

(21) Appl. No.: 12/559,622

(22) Filed: Sep. 15, 2009

(65) Prior Publication Data

US 2010/0153752 A1 Jun. 17, 2010

(30) Foreign Application Priority Data

Dec. 16, 2008 (JP) .................... 2008-319250

(51) Int. Cl.
*G06F 1/00* (2006.01)
*G06F 1/26* (2006.01)
*G06F 1/32* (2006.01)
*G06F 21/00* (2006.01)
*G06F 11/30* (2006.01)

(52) U.S. Cl. ......... 713/300; 713/340; 713/320; 713/324

(58) Field of Classification Search .................. 713/300, 713/320, 324, 340, 186
See application file for complete search history.

(56) References Cited

U.S. PATENT DOCUMENTS

| 2002/0101622 A1* | 8/2002 | Yamaguchi ................. 358/423 |
| 2005/0204144 A1* | 9/2005 | Mizutani ..................... 713/182 |
| 2006/0193500 A1* | 8/2006 | Awatsu et al. ............... 382/115 |
| 2007/0279951 A1* | 12/2007 | Wu .............................. 363/76 |
| 2007/0296714 A1* | 12/2007 | Kim ............................. 345/204 |
| 2008/0270814 A1* | 10/2008 | Starr et al. .................... 713/323 |
| 2009/0249079 A1* | 10/2009 | Suzuki et al. ................ 713/186 |

FOREIGN PATENT DOCUMENTS

| JP | 09-120321 | 5/1997 |
| JP | 11-185016 | 7/1999 |
| JP | 2000-315120 | 11/2000 |
| JP | 2002-222022 | 8/2002 |
| JP | 2003-196647 | 7/2003 |
| JP | 2003-223421 | 8/2003 |
| JP | 2005-222472 | 8/2005 |
| JP | 2006-333637 | 7/2006 |
| JP | 2007-082273 | 3/2007 |
| JP | 2007-148979 | 6/2007 |

* cited by examiner

*Primary Examiner* — Thomas Lee
*Assistant Examiner* — Samantha Hoang
(74) *Attorney, Agent, or Firm* — Antony P. Ng; Yudell Isidore Ng Russell PLLC

(57) ABSTRACT

A portable computer having a biometric authentication device is disclosed. The portable computer also includes a processor, a power supply unit having a first power system and a second power system, a power control circuit for controlling the power supply unit, and a start-up button for generating a startup signal for starting the portable computer. The biometric authentication device sends a power request signal to the power control circuit to activate the second power system upon a detection of a human user in a state where the second power system is deactivated and electric power is being supplied by the first power system. The biometric authentication device can perform an authentication operation while receiving electric power from the second power system, and the power control circuit causes the portable computer to transition to a power-on state in response to an authentication success by the biometric authentication device.

18 Claims, 11 Drawing Sheets

| TRANSITION STATE | START-UP BUTTON (PSEUDO STARTUP SIGNAL) | WOL | Fn KEY | CRTM EXECUTION | |
|---|---|---|---|---|---|
| S1 → S0 | ○ | ○ | ○ | × | WARM START |
| S2 → S0 | ○ | ○ | ○ | × | |
| S3 → S0 | ○ | ○ | ○ | × | |
| S4 → S0 | ○ (PP BIT) | ○ | × | ○ | COLD START |
| S5 → S0 | ○ (PP BIT) | × | × | ○ | |

Fig. 7

| POWER SYSTEM \ SYSTEM STATE | S0 | S3 | S4 | S5(AC) | S5(DC) |
|---|---|---|---|---|---|
| VCC1 SYSTEM | ○ | ○ | ○ | ○ | ○ |
| VCC2 SYSTEM | ○ | ○ | ○ | ○ | × |
| VCC3 SYSTEM | ○ | ○ | × | × | × |
| VCC4 SYSTEM | ○ | × | × | × | × |

COMPUTERS HAVING A BIOMETRIC AUTHENTICATION DEVICE

PRIORITY CLAIM

The present application claims benefit of priority under 35 U.S.C. §§120, 365 to the previously filed Japanese Patent Application No. JP2008-319250 entitled, "Computer Having Biometric Authentication Device" with a priority date of Dec. 16, 2008, which is incorporated by reference herein.

BACKGROUND

1. Technical Field

The present invention relates to portable computers in general, and in particular to a portable computer having a biometric authentication device.

2. Description of Related Art

Computers connected to a network or in a mobile environment are exposed to the danger of attacks or thefts by software such as computer viruses or spyware. In order to establish computer platforms capable of providing a reliable level of security, an industrial group called Trusted Computing Group (TCG) has developed and published various specifications.

A Trusted Platform Module (TPM) as defined by one of the TCG specifications is a security chip that is also referred to by "TPM chip," "Fritz chip" or "TPM Security Device." A TPM is typically mounted on the motherboard of a computer so as not to be easily removable. A TPM verifies the validity of a platform, checks the integrity of software, etc.

The above-mentioned TCG specification also describes a method for establishing a safe and reliable computer environment by making it impossible to transplant TPMs mounted on one computer to another computer, or by making computers unable to operate when TPMs are removed from their respective motherboards. In order to operate the TPM, it is necessary to input a secret character string (Shared Secret) indicating the TPM ownership into the TPM. Moreover, with regards to several privileged operations among the operations permitted based on the TPM ownership, the authentication of physical presence is required.

Two methods for asserting physical presence are defined in the above-mentioned TCG specification. The first method is a hardware method in which pressing a start-up button connected to a TPM and formed on a platform causing a TPM's internal flag to be set. Using this hardware method, it is possible to assert that a user physically possessing the platform is operating the platform. The other method is a command method that is implemented by the software in an environment capable of asserting the user is operating the platform at the level equivalent to the hardware method. In the command method, a program called Core Root of Trust for Measurement (CRTM) is executed during the boot strapping of the platform prior to being connected to a network or running an untrusted software.

After the physical presence has been asserted and the TPM ownership has been authenticated, a user is able to use a privilege command with respect to the TPM. The contents of the privilege command are described in the above-mentioned TCG specification. The details of the physical presence are described in other TCG specifications.

In order to ensure the security of a computer, users are requested to enter various passwords such as, for example, a power-on password, a supervisor password, and a hard disk drive (HDD) password after they have pressed a start-up button to activate the power supply. Since the operations of entering these passwords for each case are usually troublesome for the users, there has been used a method, so-called "single sign-on" that replaces these passwords with a single password. Since the importance of authentication by a single password is high in the single sign-on and the security of the authentication operation needs to be increased; thus, it is effective to use biometric authentication as a precondition for performing single sign-on.

Because the conventional information processing apparatus is configured to perform fingerprint collation after an operating system (OS) has been activated, the fingerprint collation has to be performed after the electric power has been supplied to multiple devices used in the information processing apparatus, whereby the capacity of a battery is consumed unnecessarily. One prior art solution is that when the fingerprint collation is performed, the electric power is supplied to only the devices necessary for the fingerprint collation, and only when the fingerprint collation result is affirmative, a main power switch is turned on so that the electric power is supplied to the remaining devices used in the information processing apparatus, thereby suppressing unnecessary battery consumption.

There is another prior art fingerprint reading method capable of suppressing unnecessary power consumption until a finger is placed on a reading surface. According to this prior art method, an apparatus is provided with a fingerprint data acquisition sensor and a finger detection sensor located at the proximity of the fingerprint data acquisition sensor, and an activation signal for acquisition of fingerprint data is output when the fingerprint detection sensor has detected a finger placement.

SUMMARY

With the use of a biometric authentication device equipped in a computer, it is possible to authenticate the physical presence that the true owner of the computer is actually present at the front of the computer. Moreover, it is effective to execute the single sign-on under the condition that biometric authentication has been performed successfully. However, the computer-initiated user authentication is performed under the assumption that the computer will be used by the same user in the times ahead. Therefore, if it is possible to activate the power of the computer on the condition that the biometric authentication was successful, it would be desirable to reduce a user's burden at the time of startup.

Furthermore, if it is possible to authenticate the physical presence and execute the single sign-on on the condition that biometric authentication was successful, it would be more desirable because it becomes possible to achieve improvement in the security of the computer and reduces the user's burden. However, in order for a biometric authentication device to be in an operable state before the power of the computer is activated, the electric power needs to be supplied to the biometric authentication device from a part of a power supply system even when the computer is not operating. When the computer is a laptop personal computer (laptop PC) capable of operating by means of a battery, a lot of power in the battery will be consumed during the non-operation state for operating a power circuit, and countermeasures are important.

In accordance with a preferred embodiment, a computer is provided with a start-up button, a biometric authentication device, a first power system, and a second power system exhibiting lesser power loss in a light load condition than the first power system. The computer is configured to be operable by means of an AC/DC adapter or a battery, and the power consumption needs to be reduced even during the non-operating state when the electric power is supplied solely by the battery. The start-up button and the biometric authentication device may be directly mounted on a casing of the computer or may be connected via a wire to a system as long as they are associated to the computer in a state such that they are usable by a user when the user has physical control of the computer. A fingerprint authentication device may be used as the biometric authentication device. When the computer is not operating, the second power system is deactivated, and the electric power is supplied to the fingerprint authentication device from the first power system. Therefore, during periods when the biometric authentication device is waiting for a swipe, it is possible to eliminate the power loss by the operation of the second power system. Upon detecting the proximity of a human body in a state of receiving the supply of electric power from the first power system, the biometric authentication device sends a switching request to a system to switch from the first power system to the second power system.

The fingerprint authentication device consumes less power during the non-operating state but consumes more power during the authentication operation. When the first power system is unable to supply electric power to the fingerprint authentication device for performing the authentication operation, electric power is supplied from the second power system so that the authentication operation can be performed. Therefore, by selectively using one of the first and the second power systems exhibiting different power loss depending on the loads, it is possible to effectively supply electric power to the fingerprint authentication device. By switching between the first power system and the second power system in an uninterrupted manner, a user is able to perform an authentication operation without being aware of the switching of the two power systems. The first power system may be configured by a linear regulator, and the second power system may be configured by a switching regulator.

After the biometric authentication device has successfully confirmed an authentication, a pseudo startup signal equivalent to the startup signal, which is generated when the start-up button is depressed, may be generated. As a result, the computer can be started with the same conditions as when the start-up button is pressed. If the computer is compliant with the TCG specifications, physical presence can be authenticated by sending a command that asserts the physical presence to a security chip when the pseudo startup signal is generated in any one of a hibernation state, a power-off (AC) state, and a power-off (DC) state.

When a command that asserts physical presence to the security chip is sent in response to the pseudo startup signal, single sign-on can be executed with respect to a power-on password, a supervisor password, and a hard disk password. The single sign-on is convenient for users, but an authentication method requires a very high level of security. Such a high level of security requirement can be met by allowing the single sign-on to be executed only when the pseudo startup signal was generated and the authentication of physical presence was successfully performed by the true user who has successfully passed the fingerprint authentication.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 7 is a table for describing a method for transitioning the system states of the laptop PC and the related operations.

DETAILED DESCRIPTION OF A PREFERRED EMBODIMENT

[Overall Hardware Configuration]

Figure 1:
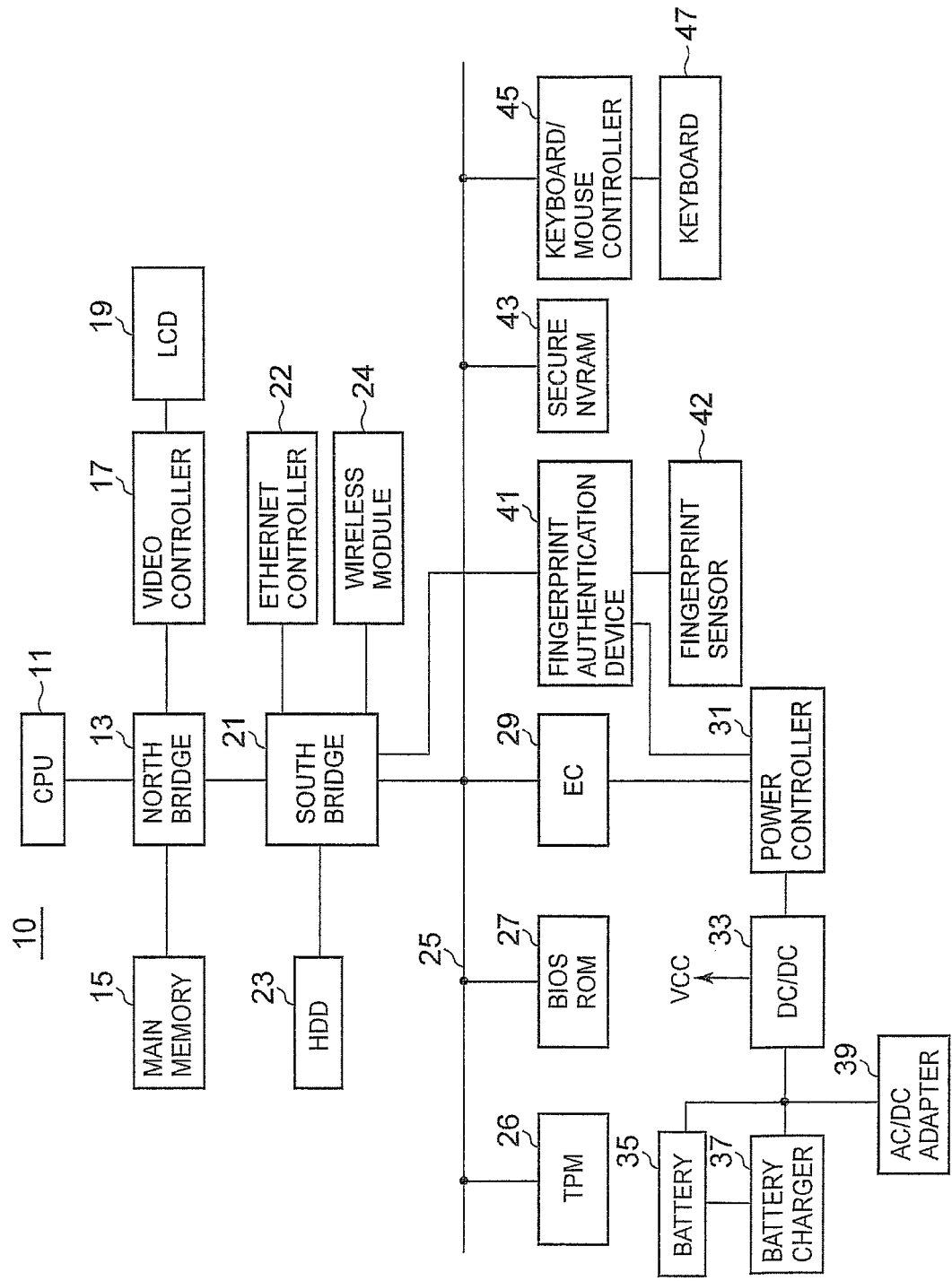
FIG. 1 is a block diagram of a laptop PC.

FIG. 1 is a block diagram illustrating the configuration of main hardware components of a laptop PC 10. A CPU 11 is an arithmetic processing device performing the central function of the laptop PC 10 and executes an operating system (OS), a BIOS, a device driver, or application programs. The CPU 11 controls a north bridge 13 and various devices connected to the north bridge 13 via various buses. The north bridge 13 is connected to a main memory 15, a video controller 17, and a south bridge 21 and has a memory controller function for controlling an operation of accessing the main memory 15, a data buffer function for absorbing a difference in a data transfer rate between the CPU 11 and other device, and the like.

Figure 6:
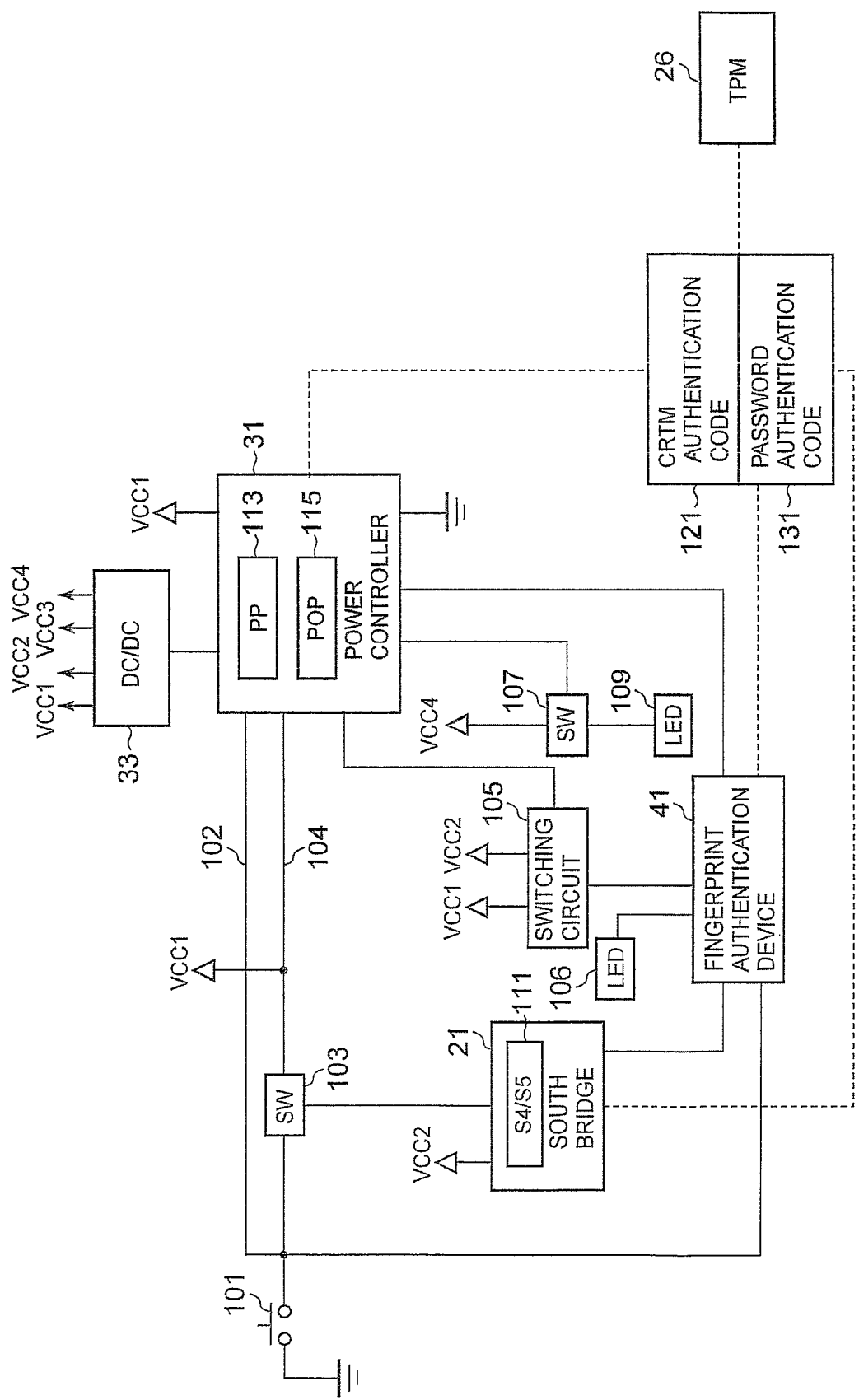
FIG. 6 is a block diagram of hardware and software components related to the startup and authentication of the laptop PC from FIG. 1.

The video controller 17 is provided with a graphics accelerator and a VRAM and is configured to receive a drawing command from the CPU 11 to produce images to be drawn and write the images in the VRAM and to deliver images read out of the VRAM to an LCD 19 as drawing data. The main memory 15 is a random access memory used as a read area of programs executed by the CPU 11 and as a work area to which processed data are written. A south bridge 21 is provided with interface functions of various standards and is connected to a hard disk drive (HDD) 23, an Ethernet controller 22, a fingerprint authentication device 41, and a wireless module 24. The south bridge 21 is provided with a status register 111 as illustrated in FIG. 6.

When the laptop PC 10 transitions its system state from one state to another state, a power control program sets a bit representing a system state of a transition designation and a bit representing the transition being made to the status register 111. Since the bits of the status register 111 are maintained even in a state other than the power-on state, when the laptop PC 10 transitions to the power-on state, the bit of a transition source is set in the status register 111.

In the HDD 23, well-known programs such as, for example, an OS, a device driver, an application program, and the like are stored. The Ethernet controller 22 is an expansion card for connecting to a wired LAN using the Ethernet standards and is connected to the south bridge 21 via a PCI Express bus and to a connector using the RJ45 standards attached to the casing of the laptop PC 10. The laptop PC 10 is able to start up using the so-called wake on LAN function when it is in a certain system state by receiving magic packets from a network via the Ethernet controller 22. The wireless module 24 is compatible with Multiple Input Multiple Output (MIMO) wireless communication specifications in compliance with the IEEE 802.11n, for example, and is connected to the south bridge 21 via a PCI Express X1 bus or a USB to thereby control data communication with a wireless network such as a WAN or a LAN.

The south bridge 21 is also connected via a PCI bus or an LPC bus 25 to legacy devices, which in the past have been used in the laptop PC 10, or devices which do not require a high-speed data transfer. The LPC bus 25 is connected to a security chip 26 (TPM: Trusted Platform Module) defined by the TCG, a BIOS_ROM 27, an embedded controller (EC) 29, a secure NVRAM 43, a keyboard/mouse controller 45, and the like.

The description of the security chip 26, the BIOS_ROM 27, and the secure NVRAM 43 will be provided later with reference to FIGS. 2, 4, and 5. The EC 29 is a microcomputer configured by an 8- to 16-bit CPU, a ROM, a RAM, and the like, and is further provided with an multi-channel A/D input terminal, a multi-channel D/A output terminal, a timer, and a digital input/output terminal. The EC 29 is able to execute a program for managing an internal operating environment of the laptop PC 10 independently of the CPU 11.

A power controller 31 is a wired digital control logic circuit (ASIC) which is connected to the EC 29 and a DC-DC converter 33 and is capable of controlling the DC-DC converter 33 based on the instructions from the EC 29. The DC-DC converter 33 converts a DC voltage supplied from an AC/DC adapter 39 or a battery 35 to a plurality of voltages necessary for operating the laptop PC 10 and then supplies the electric power to respective devices based on the power supply categories defined in accordance with a power supply mode. The description of the relationship between the system states and the power supply categories will be provided later with reference to FIG. 12. When the AC/DC adapter 39 is connected to the laptop PC 10, it supplies electric power to the DC-DC converter 33 and a battery charger 37 charging the battery 35.

The laptop PC 10 is compliant with a power saving function according to the Advanced Configuration and Power Interface (ACPI) specification and a plug-and-play function. The ACPI specification defines five sleeping states. The S1 to S3 states are states where the startup time is reduced. In the S1 state, the system contexts are maintained. The S2 state is the same as the S1 state except that the contexts of the CPU 11 and the system caches are lost. In the S3 state, in addition to the S2 state, the contexts of the north bridge 13 and the south bridge 21 are lost but the stored contents of the main memory 15 are maintained. The S3 state is commonly referred to as a suspended state or Suspend to RAM, and in this state, the laptop PC 10 turns the power off at all devices other than the main memory 15, the south bridge 21, the EC 29, and the Ethernet controller 22.

The S4 state is a state where the startup time is the longest among the system states supported by the ACPI specification, and is commonly referred to as Suspend to Disk or a hibernation state. When the laptop PC 10 transitions from the S0 state to the S4 state, it causes the OS to store the previous contexts of the laptop PC 10 in the HDD 23 and powers off all devices other than the power controller 31 and the minimal devices necessary for power activation. The S5 state is a power-off state also referred to as soft off, and the range of devices that are powered is the same as the S4 state except that the OS does not store the contexts in the HDD 23. When the WOL function is set, the electric power is supplied to the Ethernet controller 22 and the south bridge 21 from the S3 state and even in the S4 or S5 state, and the laptop PC 10 is able to start upon receiving magic packets.

Figures 11, 12:
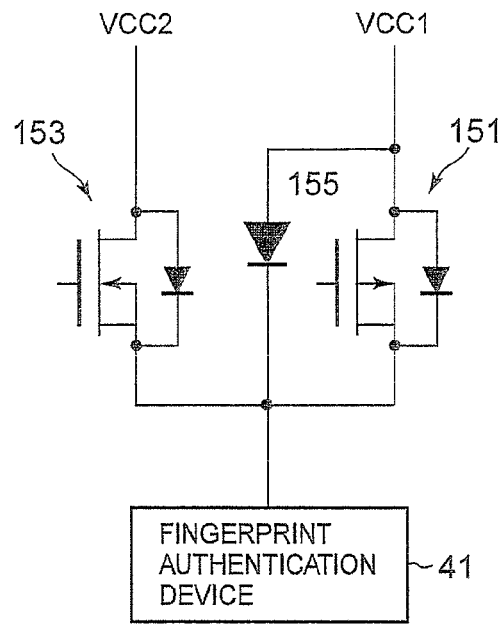
FIG. 11 is a diagram of a switching circuit.
FIG. 12 is a table describing the power systems of a DC/DC converter corresponding to respective system states.

The S0 state is a power-on state where the electric power is supplied to devices necessary for the laptop PC to operate. FIG. 12 is a table for describing the power systems of the DC/DC converter 33 corresponding to the respective system states. In the laptop PC 10, the S0 state, the S3 state, the S4 state, the S5 (AC) state, and the S5 (DC) state are defined. The S5 (AC) state means a power-off state where the AC/DC adapter 39 is connected, and the S5 (DC) state means a power-off state where the AC/DC adapter 39 is disconnected and the battery 35 is attached. In the following description, unless particularly annotated, the S5 state is intended to include both the S5 (AC) state and the S5 (DC) state. In the S5 (DC) state, electric power is supplied to the minimally necessary devices for activating the power of the laptop PC 10 in order to reduce the power consumption of the battery in the position as much as possible. Although the S1 and S2 states are defined in FIG. 12, these states are treated similar to the S3 state in the present invention.

The DC/DC converter 33 is configured by four power systems of a VCC1 system to a VCC4 system. The VCC1 system is configured to supply electric power to only the minimally necessary devices for power activation such as, for example, the power controller 31, the fingerprint authentication device 41, the status register 111 of the south bridge 21, a read sensor (not illustrated) for sensing the open state of the LCD 19, which are not operating in any of the system states. The VCC2 system is configured to supply electric power to the EC 29, the south bridge 21, the wireless module 24, and the like, which are not operating in the respective system states except the S5 (DC) state. The VCC2 system is also configured to be switched from the VCC1 system when the fingerprint authentication device 41 is performing authentication to supply electric power to the fingerprint authentication device 41; the reason and the switching method will be described later. The VCC3 system is configured to supply electric power to the main memory 15, the north bridge 13, and the like, which are operating in the S0 or S3 state. The VCC4 state is configured to supply electric power to the CPU 11, the LCD 19, the HDD 23, and the like, which are operating in the S0 state.

The VCC1 system is configured by a linear regulator which has a simple structure and exhibits less power loss in the light load condition. The linear regulator is configured to control a resistance value of a variable resistance element so as to maintain an output voltage thereof at a predetermined range. However, since the difference between the input voltage and the output voltage should be dissipated as heat, a power loss thereof increases as the load increases and the amount of heat dissipated by a heat sink reaches its allowable limit. Therefore, the linear regulator is suitable for a power source of a small load. The VCC2 to VCC4 systems are configured by a switching regulator which has a complex structure but has excellent efficiency in the heavy load condition. The switching regulator is configured to control the duty ratio of a switching element so as to maintain an output voltage thereof at a predetermined range. Since the switching regulator produces a switching loss even in the light load condition, it exhibits more power loss than the linear regulator in the case of small loads like the VCC1 system.

Referring back to FIG. 1, the EC 29 controls the DC/DC converter 33 via the power controller 31 so as to activate the necessary power system depending on the system state defined in FIG. 12. The power controller 31 is provided with status registers 113 and 115 in which a Physical Presence (PP) bit and a Physical Ownership Presence (POP) bit are set, respectively, as illustrated in FIG. 6. The purposes of the PP bit and the POP bit will be described later.

The keyboard/mouse controller 45 provides a user interface function related to input operations from a keyboard 47 or a mouse (not illustrated). The fingerprint authentication device 41 is connected to the south bridge 21 by a USB and to the power controller 31. A fingerprint sensor 42 is a swipe-type fingerprint sensor and generates a fingerprint image of a user. The fingerprint authentication device 41 and the fingerprint sensor 42 are respectively mounted to be physically integrated with the casing of the laptop PC 10. It should be noted that the fingerprint authentication device 41 and the fingerprint sensor 42 are not necessarily securely fixed to the casing but may be located within a range where a user having direct control of the laptop PC 10 is able to perform the authentication. The description of the fingerprint authentication device 41 will be provided later with reference to FIG. 3.

[Configuration of Security Chip]

Figure 2:
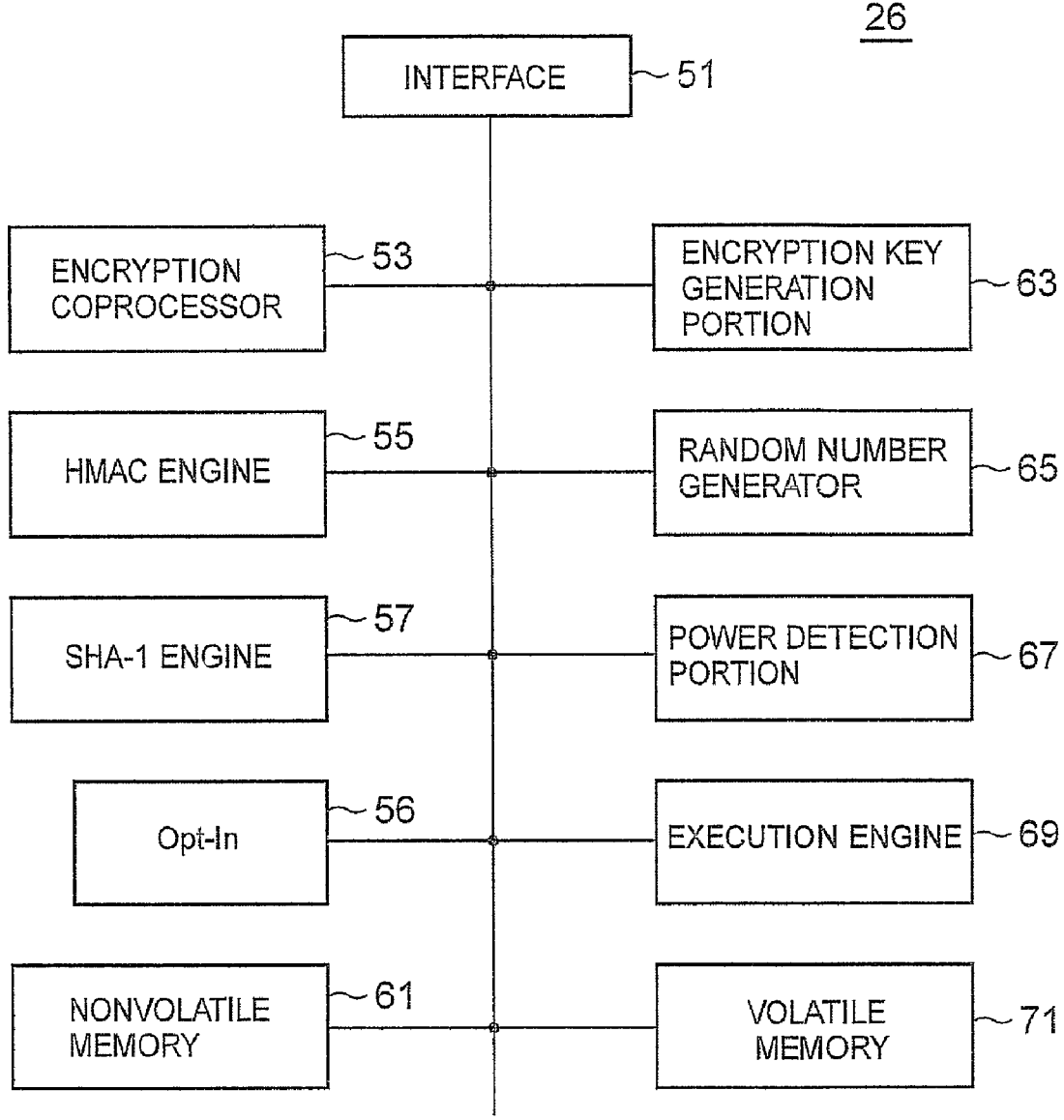
FIG. 2 is a block diagram of a security chip.

FIG. 2 is a block diagram of the security chip 26. The security chip 26 is soldered to the motherboard of the laptop PC 10 and cannot be transplanted to other computers. Even if the security chip 26 is transplanted to another computer, the other computer will not operate.

The security chip 26 is provided with a validity verification function of verifying whether a platform is trustable and compliant with the TCG specification, an integrity function of checking whether or not hardware or software is tampered, a encryption key protection function of ensuring internally preserved encryption keys are not taken outside, and various encryption processing functions. Here, a platform refers to a collection of hardware and software resources necessary for providing computer services. An interface 51 is configured to bi-directionally convert protocols between the LPC bus 25 and an internal bus so as to control the data transfer between the respective internal components of the security chip 26 and external devices. An encryption coprocessor 53 performs the encryption processing within the security chip 26. A HMAC engine 55 calculates a Keyed-Hashing for Message Authentication code (HMAC). A SHA-1 engine 57 calculates hashing values for a given value.

An Opt-in 59 provides mechanisms for putting the security chip 26 into an ON state or an OFF state. An encryption key generation portion 63 generates symmetric keys and asymmetric keys used for encryption. A random number generator 65 generates random numbers used within the security chip 26. A power detection portion 67 manages the system state of the security chip 26 in cooperation with the system state of the platform. An execution engine 69 executes a command received from the interface 51.

[Configuration of Fingerprint Authentication Device]

Figure 3:
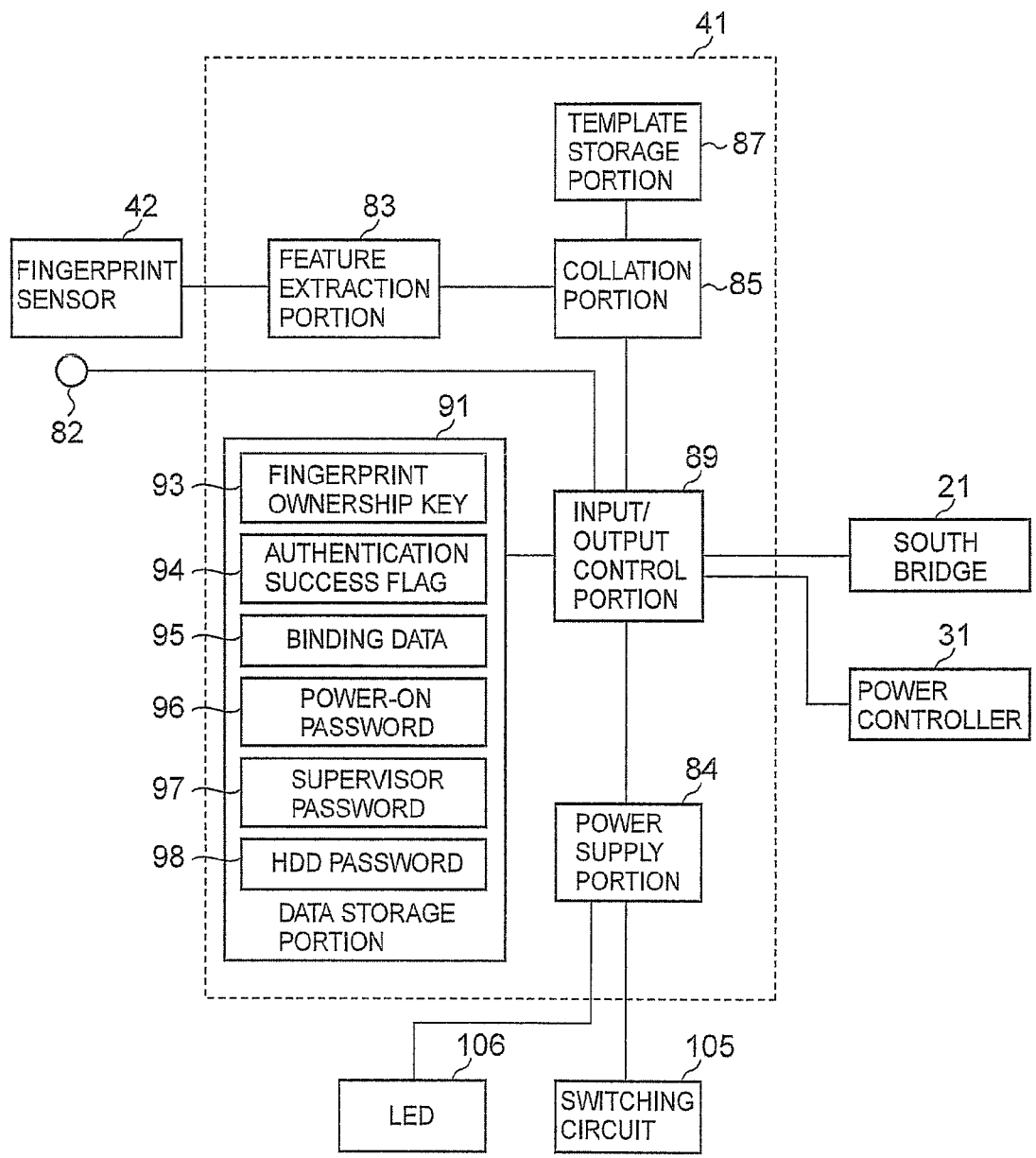
FIG. 3 is a block diagram of a fingerprint authentication device.

FIG. 3 is a block diagram illustrating the configuration of the fingerprint authentication device 41. A feature extraction portion 83 is configured to extract feature points from a fingerprint image received from the fingerprint sensor 42 and digitize the correlation of the extracted feature points to create collated fingerprint data. The fingerprint sensor 42 is provided with a proximity sensor 82 which is configured to detect a finger that is placed on the fingerprint sensor 42 during the swiping by a change in the electric field, electrostatic capacitance, or the like. A template storage portion 87 is configured to store therein the true user's collated fingerprint data registered in advance as templates. A collation portion 85 is configured to compare the collated fingerprint data which have been produced for authentication by the fingerprint sensor 42 and the feature extraction portion 83 with the templates and determine that the authentication was successful when a matching point exceeds a predetermined score.

The data storage portion 91 is a secure nonvolatile memory for storing therein a fingerprint ownership key 93, an authentication success flag 94, a binding data 95, a power-on password 96, a supervisor password 97, and a HDD password 98. In order to rewrite the data stored in the data storage portion 91, a user has to pass the authentication by the fingerprint authentication device 41 or enter a supervisor password before the OS starts operating.

An input/output control portion 89 is configured to control data transfer to/from the outside or access the data storage portion 91 via the south bridge 21. Moreover, the input/output control portion 89 sends a two-valued signal, High/Low, for setting the status registers 113 and 115 and a power request signal that requests supply of electric power from the VCC2 system to the power controller 31. Furthermore, the input/output control portion 89 sends a pseudo startup signal equivalent to a startup signal generated when a start-up button 101 (see FIG. 6) is depressed to a startup signal line 102 (see FIG. 6). A light emitting diode (LED) 106 is mounted at the proximity of the laptop PC 10 close to the fingerprint sensor 42 and is connected to the power supply portion 84. When the collation portion 85 results in a failure in fingerprint authentication, the input/output control portion 89 turns on and off the LED 106 to inform the user of the failure. The power supply portion 84 receives electric power from the switching circuit 105 to supply electric power to the fingerprint authentication device 41, the fingerprint sensor 42, the proximity sensor 82, and the LED 106. The configuration of the switching circuit 105 will be described later with reference to FIG. 11.

The fingerprint ownership key 93 is a code that is associated with the template registered for each user. The authentication success flag 94 is set by the input/output control portion 89 when the collation portion 85 determines that the template is identical to the collated fingerprint data. The binding data 95 is data that is associated with the template of the registered user. The power-on password 96 is a password that is requested by the BIOS when starting the laptop PC 10. The supervisor password 97 is a password that is requested by the BIOS when changing the settings of the BIOS. The HDD password 98 is a password that is requested by the BIOS for accessing the HDD 23.

[Configuration of BIOS_ROM]

Figure 4A:
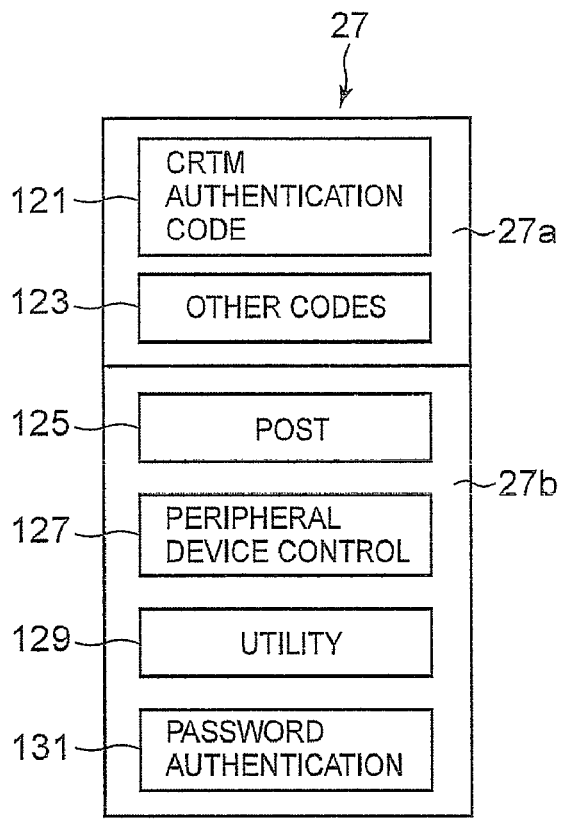
FIGS. 4A-4B are block diagrams of a BIOS_ROM.
Figure 4B:
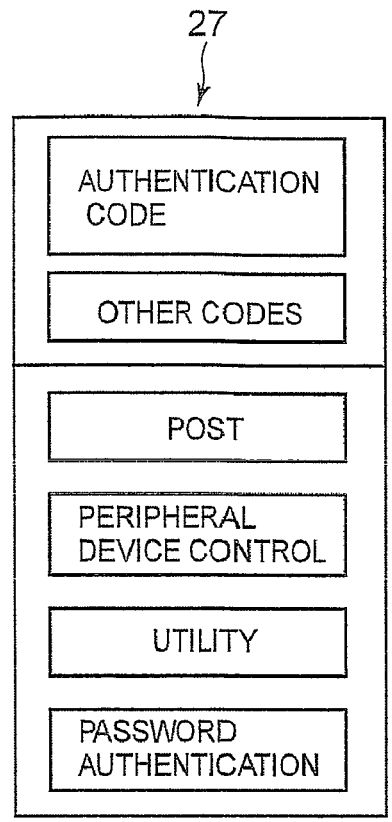

FIGS. 4A and 4B are diagrams illustrating the configuration of the BIOS_ROM 27. The BIOS_ROM 27 is a nonvolatile memory, in which the stored contents are electrically rewritable, and uses a boot block method in order to reduce the risk accompanied by the rewriting. A boot block 27a is a storage area in which writing is protected, so that programs (also referred to as codes or instructions) stored herein are treated as CRTM defined in the TPM specification and are not rewritable without special privileges. The CRTM is configured as a consistent part among the initialization codes of a platform and should be executed first upon resetting the platform. The CRTM is executed first during the cold boot where the laptop PC 10 transitions from the S4 or S5 state to the S0 state. All consistency measurements for the platforms of the laptop PC 10 are performed based on the CRTM.

In the boot block 27a, a CRTM authentication code 121 that performs the authentication of physical presence according to the present embodiment and the minimally necessary codes 123 are stored as the CRTM. The other codes 123 include the functions for testing and initializing the minimally necessary hardware components for authentication of physical presence, such as, for example, the CPU 11, the main memory 15, the south bridge 21, the fingerprint authentication device 41, and the security chip 26. The other codes 123 further include the functions necessary for rewriting the BIOS_ROM 27.

A system block 27b stores therein codes for performing the functions of the BIOS that are not executed by the other codes 123. The consistency of the codes stored in the system block 27b is calculated based on the CRTM stored in the boot block 27a. A Power-On Self Test (POST) 125 performs testing and initialization of the hardware components and a peripheral control code 127 controls the input/output operations for accessing the LCD 19, the HDD 23, the keyboard 47, and the like under the control of the BIOS. A utility 129 manages the internal temperature of the power supply and the casing. A password authentication code 131 performs authentication of the power-on password, the supervisor password, and the HDD password. The password authentication code 131 performs a process for allowing the user to set whether or not the user will activate the authentication of physical ownership presence according to the present invention and performs authentication of single sign-on.

As illustrated in FIG. 4B, the BIOS_ROM 27 may set the whole programs to be protected from rewriting so that the whole programs stored therein are used as the CRTM. In the present embodiment, the size of the CRTM increases so the updating of the BIOS_ROM 27 becomes troublesome; however, it has a merit in that more prompts can be provided than the diodes to the user by using the LCD 19 when performing the authentication of physical presence in the present embodiment. The CRTM authentication code 121 or the password authentication code 131 is executed by the CPU 11 for authenticating the physical presence by accessing the power controller 31, the fingerprint authentication device 41, the south bridge 21, and the security chip 26.

[Configuration of Secure NVRAM]

Figure 5:
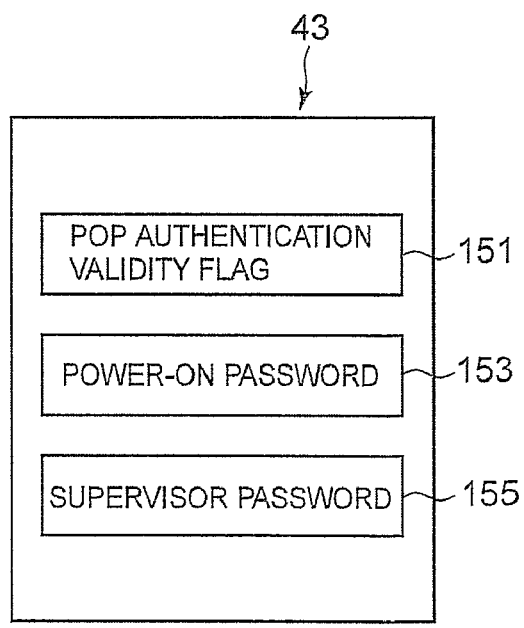
FIG. 5 is a block diagram of a secure NVRAM.

FIG. 5 is a diagram illustrating the configuration of the secure NVRAM 43. The secure NVRAM 43 is a nonvolatile memory to which access is restricted under the environment of the OS. The secure NVRAM 43 stores therein a POP authentication validity flag 151 indicating that the user has activated the authentication of physical ownership presence, a power-on password 153, and a supervisor password 155. The POP authentication validity flag 151 is set by the password authentication code 131 which is stored in the system block 27b of the BIOS_ROM 27 in the initial step after the laptop PC 10 is started based on the results of the choice as to whether the user has chosen to perform the authentication of physical ownership presence according to the present invention or the authentication of physical presence according to the prior art.

[Functional Configuration Related to Startup and Authentication of Laptop PC]

FIG. 6 is a block diagram illustrating the configuration of hardware and software components related to startup and authentication of the laptop PC 10. The start-up button 101 is attached to be physically integral with the casing of the laptop PC 10 and can be depressed by a user having physical control of the laptop PC 10. It should be noted that the start-up button 101 may be connected to the laptop PC 10 by being located at a position where a user having physical control of the laptop PC 10 can depress the start-up button 101. The start-up button 101 is connected to the startup signal line 102 and the power controller 31. The user is able to send an startup signal to the power controller 31 through the startup signal line 102 by depressing the start-up button 101. The power controller 31 controls the DC/DC converter 33 when the laptop PC 10 in the S3, S4 or S5 state has received the startup signal from the start-up button 101 through the startup signal line 102 to supply electric power to respective devices by predetermined procedures so that the laptop PC 10 transitions to the S0 state.

The start-up button 101 is connected to one terminal of a switch 103. The other terminal of the switch 103 is connected to the power controller 31 through a bit setting line 104. A control terminal of the switch 103 is connected to the south bridge 21. The turning on and off of the switch 103 is controlled based on the value of the status register 111 of the south bridge 21. The switching circuit 105 is connected to the power controller 31, the DC/DC converter 33, and the fingerprint authentication device 41, and the VCC1 system and the VCC2 system of the DC/DC converter 33 are switched in accordance with the control signal of the power controller 31, so that the electric power is supplied to the fingerprint authentication device 41 by any one of the power systems.

The fingerprint authentication device 41 is connected to the LED 106 that prompts re-swiping to the user by being turned on and off when the fingerprint authentication results in failure. The fingerprint authentication device 41 is connected to a USB port of the south bridge 21 and the start-up button 101. The fingerprint authentication device 41 communicates with a system via the south bridge 21 and sends the pseudo startup signal to the power controller 31 through the startup signal line 102. The pseudo startup signal is a signal capable of performing an equivalent function to the startup signal on the power controller 31. The fingerprint authentication device 41 is connected to the power controller 31 and sends the power request signal and a two-valued signal, High/Low, for setting the status registers 113 and 115 to the power controller 31. A switch 107 has one terminal thereof being connected to the VCC4 system of the DC/DC converter 33 and the other terminal thereof being connected to a light emitting diode 109. A control terminal of the switch 107 is connected to the power controller 31. The LED 109 is attached to the casing of the laptop PC 10 near the fingerprint sensor 42 and is turned on and off when prompting a swipe to the user.

[Configuration of Switching Circuit]

FIG. 11 is a circuit diagram illustrating the configuration of the switching circuit 105 illustrated in FIG. 6. The switching circuit 11 is a circuit for switching between the VCC1 system and the VCC2 system for supplying electric power from the DC/DC converter 33 to the fingerprint authentication device 41. The switching circuit 105 is configured by a p-channel FET 151, an n-channel FET 153, and a diode 155. The FET 151 has a source thereof being connected to the VCC1 system of the DC/DC converter 33 a drain thereof being connected to the fingerprint authentication device 41. A diode 155 has an anode thereof being connected to the source of the FET 151 and a cathode thereof being connected to the fingerprint authentication device 41. The FET 153 has a drain thereof being connected to the VCC2 system of the DC/DC converter 33 and a source thereof being connected to the fingerprint authentication device 41.

To the gates of the FET 151 and the FET 153, the control signal is supplied from the power controller 31. When the control signal is supplied from the power controller 31, the FET 151 and the FET 153 perform reversal operations. The fingerprint authentication device 41 is operable in two operation modes of an idle mode and an authentication mode. Well-known products of such a fingerprint authentication device having such operation modes are available by the UPEK Corporation under model number TCS5B/TCD50 or the AuthenTec Corporation under model number AES2810. The fingerprint authentication device operates while consuming the minimally necessary power for detecting the proximity of a finger during the idle mode and performs the authentication by comparing the collated fingerprint data with the templates while consuming the maximum power during the authentication mode.

In the present embodiment, when the laptop PC 10 is in the S5 (DC) state, the electric power is supplied to the fingerprint authentication device 41 from the VCC1 system. The VCC1 system is configured by a linear regulator because the power consumption of a load is small. The fingerprint authentication device 41 is able to supply electric power within the range of capacity of the linear regulator when it is operating in the idle mode; however, when it is operating in the authentication mode, pragmatically it is difficult to sufficiently dissipate heat with a heat sink having a suitable size for accommodation in the laptop PC. However, if the capacity is increased so that the electric power can be supplied from a linear regulator of the VCC1 system even during the operation in the authentication mode, the capacity and the size needs to be increased for devices which are used less frequently, and it is not desirable.

When the VCC1 system is configured by a switching regulator, the efficiency in the light load condition is low because of its switching loss and the regulator is expensive, so it is not desirable. Therefore, in the present embodiment, the electric power is supplied to the fingerprint authentication device 41 from two power systems of the VCC1 system and the VCC2 system so that the electric power can be effectively supplied. Referring to FIG. 11, when the electric power is supplied from the VCC1 system to the fingerprint authentication device 41, the power controller 31 deactivates the control signal to the gates of the FET 151 and the FET 153 so that the FET 151 is turned ON and the FET 153 is turned OFF. When switching from the VCC1 system to the VCC2 system, the control signal is activated.

Since the electric power is continuously supplied via the diode 155 to the fingerprint authentication device 41 even at the time of switching the power systems, the power supply portion 84 of the fingerprint authentication device 41 is not affected by the disconnection of the power systems. When the VCC2 system is disconnected, the VCC1 system is able to supply electric power to the fingerprint authentication device 41 through the diode 155; however, since a voltage drop occurs in the diode 155, the electric power is actually supplied from the VCC2 system. When the laptop PC 10 is in a system state other than the S5 (DC) state, the control signal is activated and the electric power is supplied from the VCC2 system to the fingerprint authentication device 41.

[System State]

FIG. 7 is a table describing a method for transitioning the system states to the power-on state in the laptop PC 10 and the related operations. FIG. 7 illustrates the method for transitioning from any one of the S1 to S5 states to the S0 state. Depressing of the start-up button 101 may be executed from any of the system states. The WOL function can be executed from any state except for the transitioning from the S5 state. Depressing of the function key (Fn key) of the keyboard 47 can be executed from any state except for the transitioning from the S4 or S5 state.

The CRTM authentication code 121 and the other codes 123 of the boot block 27a can be executed before the OS starts booting only when transitioning from the S4 or S5 state to the S0 state. The transitioning from the S4 or S5 state to the S0 state is referred to as cold start or cold boot, and the transitioning from the other system states to the S0 state is referred to as warm start or warm boot. As will be described later, only when the start-up button 101 is depressed and the cold start is performed, the PP bit for authenticating physical presence is set to the status register 113. However, in the present embodiment, even when the fingerprint authentication device 41 sends the pseudo startup signal to the power controller 31 via the startup signal line 102, it is processed as if the start-up button 101 is pressed and the cold start is performed, whereby the PP bit is set to the status register 113.

[Startup and Authentication Method of Laptop PC]

Figure 8:
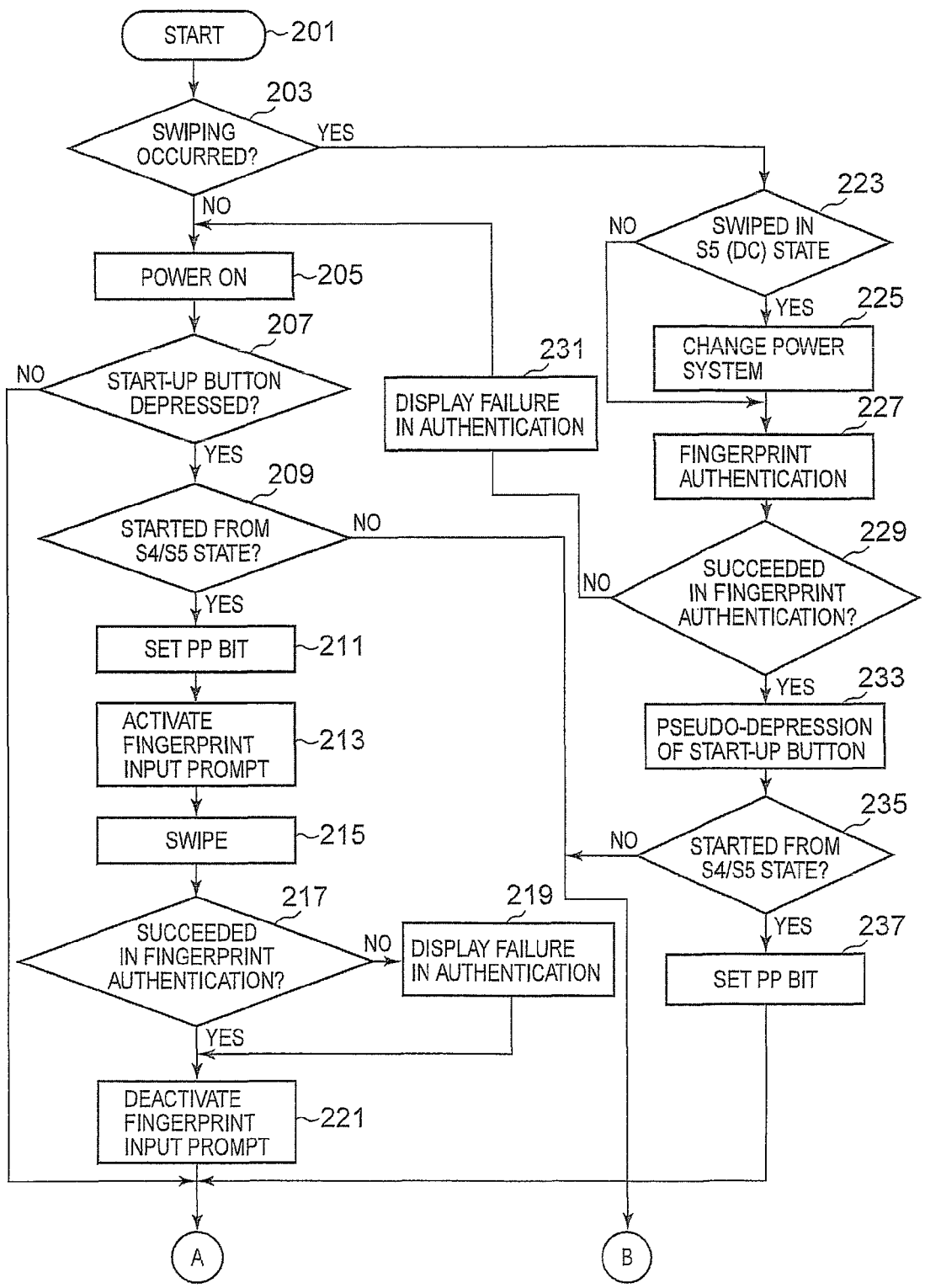
FIGS. 8-10 are flowcharts of a method of the startup and the authentication of the laptop PC from FIG. 1.
Figure 9:
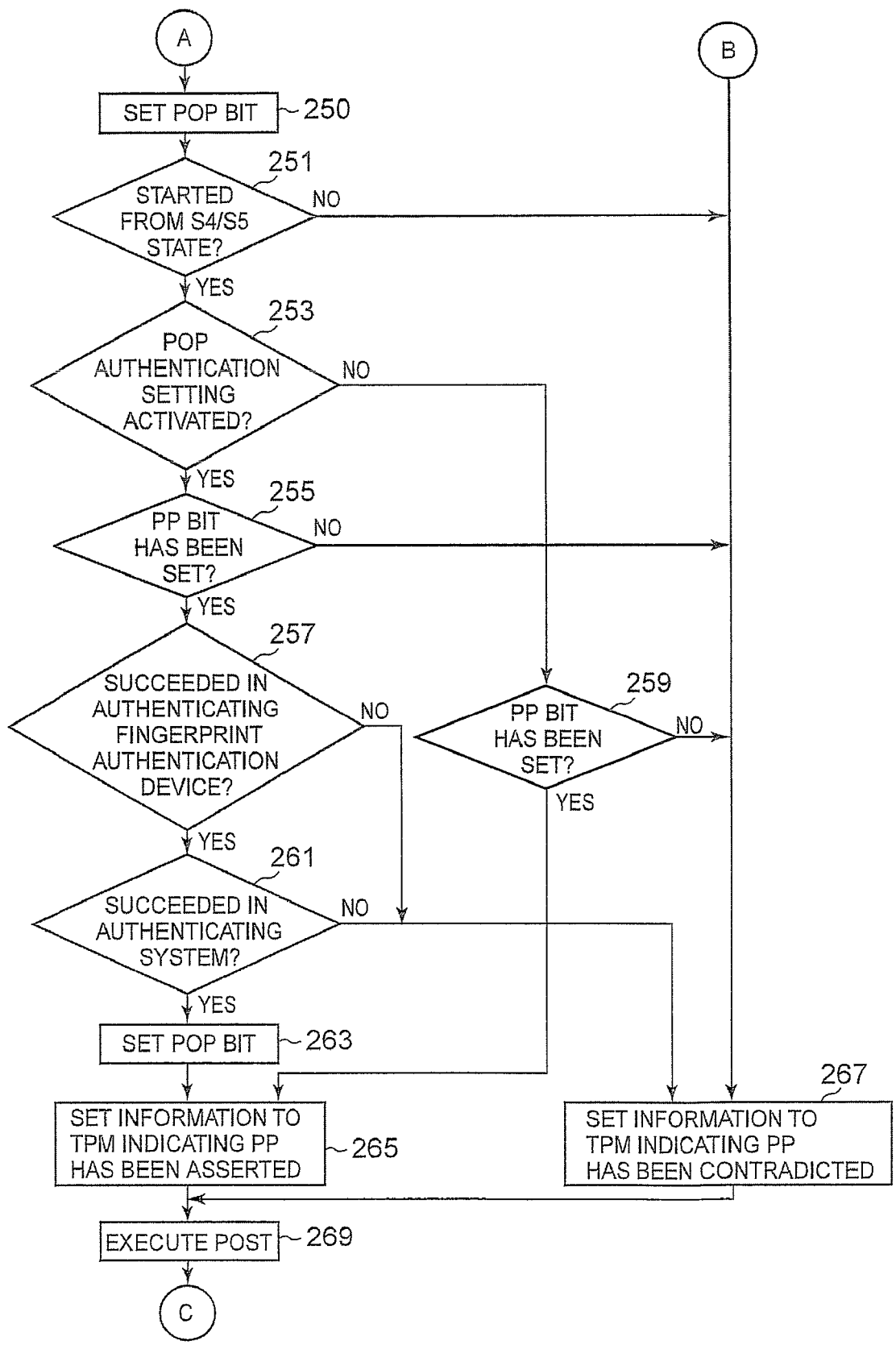
Figure 10:
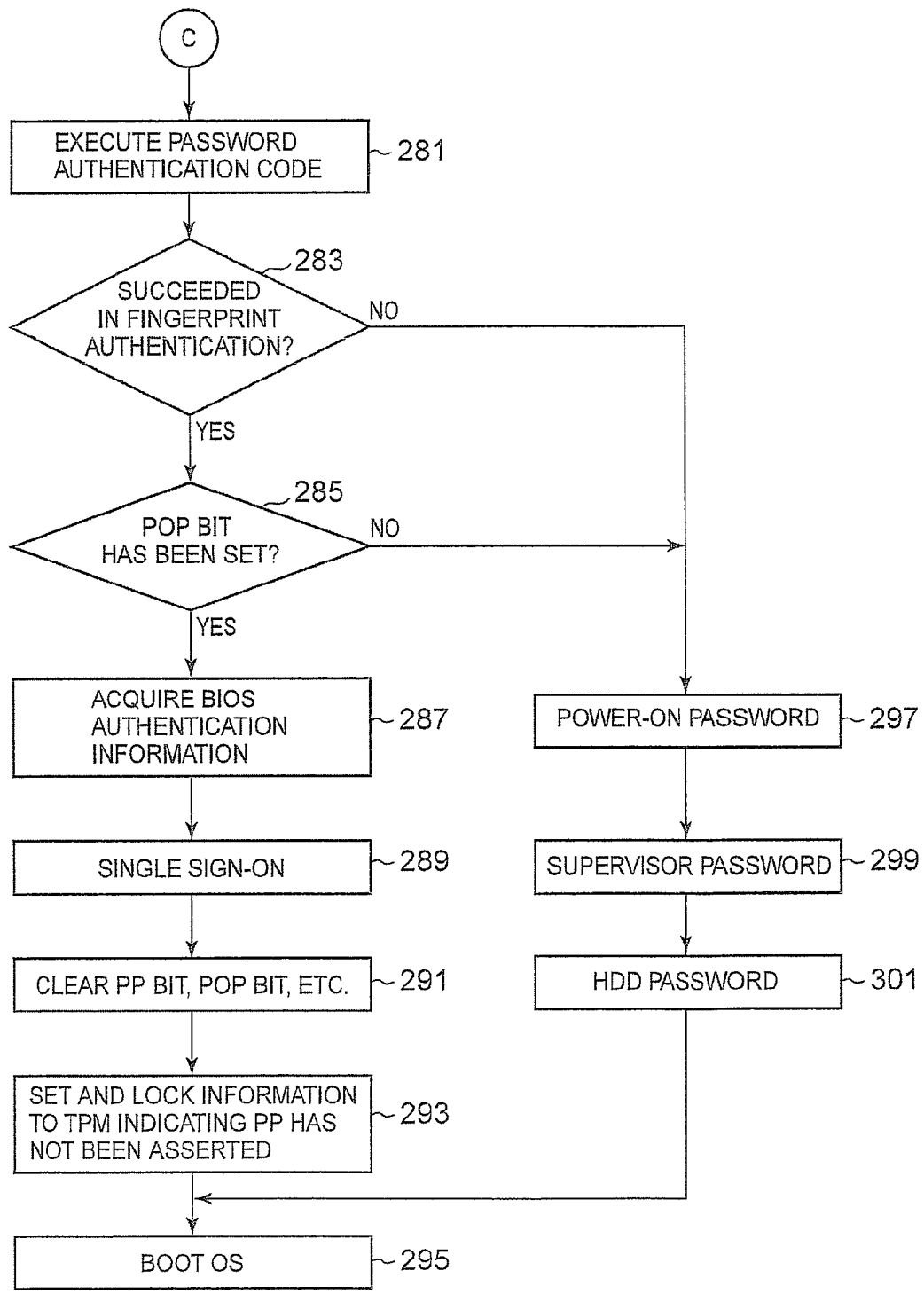

FIGS. 8-10 are flowcharts illustrating a method for the authentication accompanied by the activation of power of the laptop PC 10 based on the software and hardware components illustrated in FIGS. 1-7 and 11-12. FIG. 8 illustrates a method for startup and fingerprint authentication under a hardware environment; FIG. 9 illustrates a method for the authentication of physical presence and physical ownership presence by the CRTM authentication code 121; and FIG. 10 illustrates a method for the authentication of single sign-on by the password authentication code 131.

In block 201 of FIG. 8, the laptop PC 10 has been transitioned to any one of the S3 state, the S4 state, the S5 (AC) state, and the S5 (DC) state, and four power systems of the DC/DC converter 33 illustrated in FIG. 12 are operating depending on the respective system states. Although the fingerprint authentication device 41 is able to perform authentication in any of the system states, in the present embodiment, in the S5 (DC) state, the switching circuit 105 supplies electric power to the fingerprint authentication device 41 from the VCC1 system, and the VCC2 system is activated in response to the start of a swiping, whereby the power systems are switched.

In block 203, the fingerprint authentication device 203 waits for a swiping of a finger by the user. When the user does not swipe the finger at this time instance, the process proceeds to block 205, and the laptop PC 10 transitions to the power-on state (the S0 state) in response to the depression of the start-up button 101, reception of the magic packets for activation of the WOL function, or the depression of the Fn key of the keyboard 47. When it is determined in block 207 that the power-on state is initiated by the depression of the start-up button 101, the process proceeds to block 209, and the power-on state initiated by other causes is processed by the routine A.

When the start-up button 101 is pressed, the laptop PC 10 transitions from any one of the S3 to S5 states to the S0 state. Upon receiving the startup signal through the startup signal line 102 in response to the depression of the start-up button 101, the power controller 31 controls the DC/DC converter 33 to supply electric power to all devices corresponding to the S0 state. The south bridge 21 turns on the switch 103 only in the case of the cold start by referring to the status register 111. When the start-up button 101 is depressed in the on state of the switch 103, the startup signal is sent to the power controller 31 through the bit setting line 104.

In the case of a "cold start," the south bridge 21 causes the CPU 11 to be in the idle state until the fingerprint authentication is completed after block 205 is performed. When the startup signal is received through the bit setting line 104, a hardware logic circuit of the power controller 31 determines in block 209 that the laptop PC 10 has been cold-started in response to the depression of the start-up button 101. Then, the hardware logic circuit sets the PP bit to the status register 113 in block 211 and turns on/off the switch 107 to turn on and off the LED 109 provided at the proximity of the fingerprint sensor 42, thereby generating prompts that urges the user to swipe the finger in block 213. When the system state of the laptop PC 10 is the S5 (DC) state in block 201, the power controller 31 sends a control signal to the switching circuit 105 to supply electric power from the VCC2 system to the fingerprint authentication device 41. When the system state of the laptop PC 10 is any state other than the S5 (DC) state in block 201, since the electric power has been supplied from the VCC2 system to the fingerprint authentication device 41, the switching of power by the switching circuit 105 is not performed.

At this instance, since the CPU 11 is in the idle state, it is unable to execute programs to output prompts to the LCD 19 for requesting the fingerprint input. Even when the CPU 11 is operated to execute the CRTM, since the BIOS_ROM 27 employs the boot block method, the LCD 19 is not operated until the codes of the system block 27b are executed. Therefore, in block 213, the LED 109 is turned on and off in order to urge the user to swipe the finger by means other than the LCD 19.

However, as illustrated in FIG. 4B, when all the codes stored in the BIOS_ROM 27 are used as the CRTM, a prompt for urging the swiping of the finger may be displayed on the LCD 19 at this time. When the power controller 31 has not received the startup signal through the bit setting line 104 in block 209, the laptop PC 10 is regarded as if it performed a warm start because the start-up button 101 was pressed, and the PP bit is not set and the routine B is processed. Since the CRTM authentication code 27a is not executed in the case of the warm start, the authentication of physical presence is not performed.

In block 215, the user swipes the finger on the fingerprint sensor 42. In block 217, the fingerprint authentication device 41 compares the templates of the user registered in advance in the template storage portion 87 with the collated fingerprint data to perform the fingerprint authentication. When the fingerprint authentication was successful, the input/output control portion 89 set the authentication success flag 94 to the data storage portion 91 to stop the fingerprint authentication in block 221 and sends a stop signal composed of two values, High/Low, to the power controller 31. The power controller 31 having received the stop signal stops the turning on/off of the LED 109. Since the stop signal is produced solely by hardware and set without intervention of software, it is possible to maintain a high level of security.

When it is determined that the input fingerprint image is not identical to the template even after a predetermined number of collating operations or a predetermined period of time has elapsed, the collation portion 85 proceeds to the block 219 to turn on and off the LED 106, and thereafter proceeds to the block 221 to stop the turning on/off of the LED 106, and finally proceeds to the routine A. When the fingerprint authentication results in failure, the input/output control portion 89 does not set the authentication success flag 94 to the data storage portion 91. During the execution of the procedures of block 209 to block 221, since the fingerprint authentication device 41 is controlled solely by the hardware logic circuit, the operation of the fingerprint authentication device 41 will not be controlled by tampered software or spyware and thus it is safe.

Figure 13:
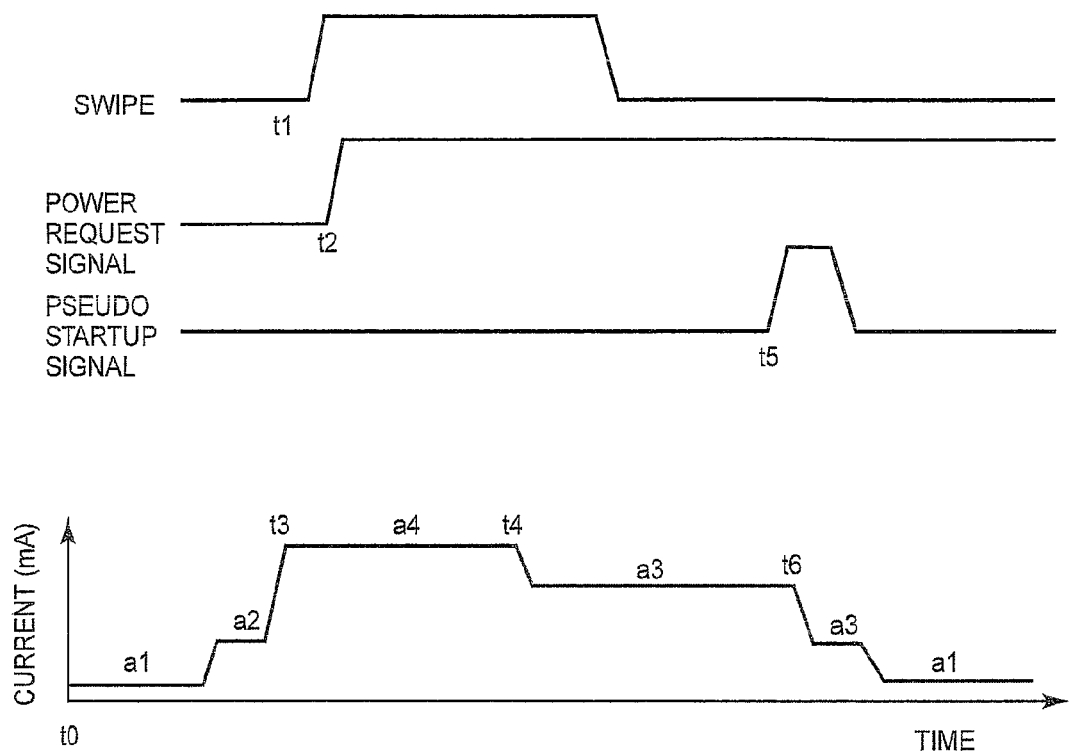
FIG. 13 is a timing diagram describing power consumption when the fingerprint authentication device performs an authentication operation.

Next, the procedures for when the swiping occurs in block 203 will be described. When the system state of the laptop PC 10 is the S5 (DC) state in block 201, since the electric power is not supplied from the VCC2 system to the fingerprint authentication device 41, it is practically impossible for the VCC1 system to supply electric power necessary for the authentication mode. Therefore, it is necessary to change the power system for the fingerprint authentication device 41 in response to the swiping. FIG. 13 is a timing diagram describing the power consumption when the fingerprint authentication device 41 incorporated into the laptop PC 10 performs an authentication operation. In FIG. 13, the power consumption is described in terms of current. Moreover, in FIG. 13, the current values a1 mA to a4 mA are in the relation of a1<a2<a3<a4. In one example, a1 is about 1 to 1.3 mA, and a4 is about 80 to 100 mA.

When the laptop PC 10 is in the S5 (DC) state in block 223, the process proceeds to block 225 to change the power system. When the laptop PC 10 is in any state other than the S5 (DC) state in the block 223, the process proceeds to block 227 because the electric power is being supplied from the VCC2 system to the fingerprint authentication device 41. In block 225, as illustrated in FIG. 13, the proximity sensor 82 is operating while consuming a current of a1 mA, and the fingerprint authentication device 41 operating in the idle mode at time t0 is able to detect the proximity of the user's finger for swiping on the proximity sensor 82. The linear regulator of the VCC1 system is able to supply electric power to the fingerprint authentication device 41 operating in the idle mode within the range of its rated capacity.

The user first sets the finger on the fingerprint sensor 42 and then swipes the finger when swiping the finger on the fingerprint sensor 42. When the proximity sensor 82 detects at time t1 that the finger is placed on a detection portion, although the current flowing in the fingerprint authentication device 41 increases up to a2 mA as a preparatory step for transition to the authentication mode, the linear regulator of the VCC1 system is able to supply electric power to the fingerprint authentication device 41 in this step within the range of its rated capacity. Thereafter, at time t2, the input/output control portion 89 sends a power request signal to the power controller 31 for switching from the VCC1 system to the VCC2 system. The power controller 31 having received the power request signal sends a signal to the DC/DC converter 33 in order to process the power request signal to thereby activate the switching regulator of the VCC2 system within one msec. When the VCC2 system is activated, the power controller 31 sends a control signal to the switching circuit 105 to change the power source for the fingerprint authentication device 41 to the VCC2 system.

The fingerprint authentication device 41 proceeds to the authentication mode for about 40 msec when it enters the preparatory step, and at this instance, the fingerprint authentication device 41 is already being supplied with the electric power from the VCC2 system. When the process proceeds to the block 227 and the authentication mode is executed at time t3, the fingerprint authentication device 41 consumes a current of a4 mA. The DC/DC converter 33 is able to supply electric power from the VCC2 system to the fingerprint authentication device 41 operating in the authentication mode; however, the VCC1 system has insufficient capacity for supplying the electric power. When the swiping occurs during periods between the time t3 and time t4 and the collated fingerprint data are created, the collated fingerprint data are collated with the template stored in the template storage portion 87 by the collation portion 85, and the current decreases to a3 mA.

When the authentication was successful, the input/output control portion 89 sets the authentication success flag 94 to the data storage portion 91 and proceeds to block 233 where the input/output control portion 89 sends a pseudo startup signal to the power controller 31 and the switch 103 through the startup signal line 102 at time t5. Since the pseudo startup signal performs an equivalent function to the startup signal initiated by the depression of the start-up button 101, the generation of the pseudo startup signal by the input/output control portion 89 will be regarded as pseudo depression. The power controller 31 having received the pseudo startup signal controls the DC/DC converter 33 to activate all power systems so that the electric power is supplied to devices operating in the S0 state.

When the system state in block 201 is either the S4 state or the S5 state, since the south bridge 21 turns on the switch 103, the pseudo startup signal is sent at block 235 to the power controller 31 through the bit setting line 104. The hardware logic circuit of the power controller 31 determines that the laptop PC 10 has been cold-started because the start-up button 101 was depressed and sets the PP bit to the status register 113 in block 237.

When the fingerprint authentication results in a failure in block 229, the process proceeds to block 231 where the fingerprint authentication device 41 turns on and off the LED 106 to inform the user of failure in authentication. Then the user, being aware of the inability to start the laptop PC 10 by means of fingerprint authentication will activate the power at block 205 by any one of the three methods illustrated in FIG. 7. When the system state in block 201 is the S3 state, the PP bit is not set in block 235 and the process proceeds to the routine B.

The description will be continued with reference to FIG. 9. The steps in FIG. 9 are started from the routines A and B in FIG. 8. In block 250, the south bridge 21 receives a signal from the fingerprint authentication device 41 and becomes aware of the completion of the fingerprint authentication. Then, the south bridge 21 sends a signal to the CPU 11 operating in the idle state to activate its operation. The start address of the CRTM stored in the boot block 27a is set at the pointer at which the CPU 11 executes first, and the execution of the CRTM authentication code 121 is started when the testing and the initialization of main chips such as the CPU 11, the north bridge 13, and the south bridge 21 are completed.

In block 251, the CRTM authentication code 121 refers to the status register 111 of the south bridge 21 to determine whether the laptop PC 10 has performed a cold-start or a warm start. The TCG specification defines a physical method, a command method, and a method that combines the two methods, as the method for authenticating the physical presence that the user is actually at the front of a platform. The physical method is a method in which a switch or a jumper provided to a platform sends a signal directly to a TPM. The command method is a method in which a CRTM sends a signal to the TPM before a PC is powered and the control is transferred to the OS.

In the present embodiment, the CRTM authentication code 121 controls the PP bit generated in response to the depression of the start-up button 101, the fingerprint authentication device 41, the power controller 31, and the south bridge 21 to perform the authentication of physical presence. The depression of the start-up button 101 includes so-called pseudo depression which is initiated by the fingerprint authentication device 41 generating the pseudo startup signal. When the CRTM authentication code 121 determines in block 251 that the laptop PC 10 has performed the warm start, the process proceeds to block 267. When the CRTM authentication code 121 determines in block 251 that the laptop PC 10 has been cold-started, the process proceeds to block 253.

In the block 253, the CRTM authentication code 121 determines whether or not the authentication of the physical ownership presence is activated by referring to the POP authentication validity flag 151 of the secure NVRAM 43. When the user has deactivated the POP authentication validity flag 151 to the secure NVRAM 43 so that the authentication of the physical ownership presence is not performed, the process proceeds to block 259 in order to perform the authentication of physical presence by the conventional method.

In block 259, the CRTM authentication code 121 refers to the status register 113 of the power controller 31 to determine whether or not the PP bit is set. When the cold start was performed in response to the depression of the start-up button 101 or the pseudo depression, because the PP bit must be set to the status register 113 in the blocks 211 or 237, the physical presence will be asserted and the process proceeds to block 265. When the cold start was performed by the WOL function, because the PP bit must not be set to the status register 113, the physical presence will be contradicted and the process proceeds to the block 267.

Returning to the block 253, when the user has activated the POP authentication validity flag 151 to the secure NVRAM 43 so that the authentication of physical ownership presence is performed, the process proceeds to block 255 where the CRTM authentication code 121 refers to the status register 113 to determine whether or not the PP bit is set. If the PP bit is not set, since it is the case where the startup is initiated by the WOL function, the process proceeds to the block 267. If the PP bit is set, the process proceeds to block 257 where the authentication of the fingerprint authentication device 41 is performed by the security chip 26. The CRTM authentication code 121 sends a request for the binding data 95 to the fingerprint authentication device 41.

When the authentication success flag 94 representing the success in the fingerprint authentication in block 217 or 229 is set, the input/output control portion 89 of the fingerprint authentication device 41 reads the binding data 95 out of the data storage portion 91 and delivers the read data to the CRTM authentication code 121. The CRTM authentication code 121 transmits the binding data 95 to the security chip 26. If the authentication success flag 94 is not set, the input/output control portion 89 does not deliver the binding data 95 to the CRTM authentication code 121, the process proceeds to the block 267 in order to process as if the authentication of the physical ownership presence resulted in a failure. The security chip 26 stores the binding data 95 in an internal PCR (Platform Configuration Register) in block 261.

The security chip 26 having received the binding data 95, calculates the hashing values of the binding data 95 stored in the PCR and compares the hashing values with the binding data of the fingerprint authentication device 41 which have been hashed and registered in the PCR. When the comparison result shows that they are identical, the security chip 26 transmits a fingerprint ownership key stored therein to the CRTM authentication code 121. When they are not identical, the security chip 26 does not transmit the fingerprint ownership key to the CRTM authentication code 121. When the CRTM authentication code 121 has received the fingerprint ownership key from the security chip 26, the CRTM authentication code 121 determines that the authentication of the fingerprint authentication device 41 was successful and transmits the fingerprint ownership key to the fingerprint authentication device 41 and the process proceeds to the block 261. When the CRTM authentication code 121 has not received the fingerprint ownership key, the process proceeds to the block 267 in order to process as if the authentication of physical ownership presence resulted in a failure.

The fingerprint ownership key is a value that corresponds to the template of the fingerprint image generated by the fingerprint sensor 42 for registration, and the same value is also stored in the data storage portion 91 of the fingerprint authentication device 41. In the block 261, the input/output control portion 89 of the fingerprint authentication device 41 determines whether or not the fingerprint ownership key transmitted from the security chip 26 by the CRTM authentication code 121 is identical to the fingerprint ownership key 93 stored in the data storage portion 91. If both keys are identical to each other, then it is determined that the authentication of the system was successful, and the physical ownership presence is asserted. Then, the input/output control portion 89 of the fingerprint authentication device 41 sends a two-valued signal High/Low to the status register 115 of the power controller 31 to set the POP bit in block 263. The fingerprint authentication device 41 performing the setting of the POP bit without intervention of software, thereby improving the level of security.

In the blocks 257 and 261, the fingerprint authentication device 41 and the security chip 26 are bi-directionally authenticated, respectively, so that when any one of or both of them are rebooted from the platform with malicious intent, the physical presence can be contradicted with certainty. In the block 265, when CRTM authentication code 121 detects either one of a case where the POP authentication validity flag 151 is set to the secure NVRAM 43 and the POP bit is not set to the status register 115 and a case where the POP authentication validity flag 151 is not set to the secure NVRAM 43 and the PP bit is set to the status register 113, the CRTM authentication code 121 transmits a command, TSC_PhysicalPresencePresent, to the security chip 26. The security chip 26 having received the command internally sets a TPM_PhysicalPresence flag to affirmative (true).

In this case, the TPM_PhysicalPresence flag is set affirmative (true) from two cases. When the POP bit is set in the block 263, the physical ownership presence according to the present invention is asserted, and the laptop PC 10 is started in response to the pseudo depression or the depression of the start-up button 101 by the user whose fingerprint is registered in advance as the owner's fingerprint. When it is determined in the block 259 that only the PP bit is set, the physical presence is asserted by the conventional method, and the laptop PC 10 is started in response to the depression of the start-up button by an unspecified user.

However, regardless of the path on how the TPM_PhysicalPresence flag was set affirmative, the security chip 26 permits execution of a privilege command of the same level at that time instance. The privilege command includes clearing information indicating the present owner from the security chip 26, temporarily deactivating the security chip 26, and disabling the security chip 26. The specific contents of the privilege command are described in one of the TCG specifications.

In block 267, when CRTM authentication code 121 detects either one of a case where the POP authentication validity flag 151 is set to the secure NVRAM 43 and the POP bit is not set to the status register 115 and a case where the PP bit is not set to the status register 113, the CRTM authentication code 121 transmits a command, TSC_PhysicalPresenceNotPresent, to the security chip 26 to set the TPM_PhysicalPresence flag to negative (false).

In this case, the security chip 26 does not permit the privilege command. When the setting of the TPM_PHysicalPresence flag is completed in the blocks 265 or 267, the process proceeds to block 269 where the POST 125 stored in the system block 27b is executed. The subsequent steps will be described with reference to FIG. 10. The steps in FIG. 10 are started from the routine C in FIG. 9. In block 281, the password authentication code 131 which is stored in the system block 27b subsequently to, or in the course of, the execution of the POST 125 is executed. At this instance, it is possible to use the LCD 19 and the keyboard 47 with the aid of the screen of the BIOS. In block 283, the password authentication code 131 makes inquiries to the fingerprint authentication device 41 as to whether or not the fingerprint authentication was successful at this time of startup. The input/output control portion 89 notifies the password authentication code 131 of the results of the inquiries by referring to the authentication success flag 94 of the data storage portion 91.

When it is determined that the fingerprint authentication was successful at this instance of startup, the password authentication code 131 proceeds to block 285 while proceeding to block 297 when it is determined that the fingerprint authentication resulted in a failure. In the block 285, the password authentication code 131 determines whether or not the POP bit is set to the status register 115. When the POP bit is set, the process proceeds to block 287 while proceeding to the block 297 when the POP bit is not set.

In the block 287, the password authentication code 131 acquires the power-on password 96, the supervisor password 97, and the HDD password 98 from the data storage portion 91 of the fingerprint authentication device 41. In block 289, the password authentication code 131 compares the passwords with the power-on password 153 and the supervisor password 155 stored in the secure NVRAM 43 and the HDD password acquired from the HDD 23 and completes the authentication of these passwords without user intervention. Such a method of performing a plurality of individual authentication operations performed by the user by a single action is referred to as single sign-on (SSO). The individual authentication requires separate authentication for the purpose of strengthening the security, and such an authentication method must be troublesome to the users.

Therefore, although the single sign-on can enhance the user's convenience, it is necessary to make sure the security level will not degraded compared to the individual authentication when allowing the single sign-on to be executed. In the block 289, the single sign-on is performed on condition that the physical ownership presence is asserted; therefore, the security level is higher than the conventional single sign-on.

In block 291, the password authentication code 131 resets the PP flag and the POP flag of the status registers 113 and 115 and requests the fingerprint authentication device 41 to reset the authentication success flag 94 of the data storage portion 91. The input/output control portion 89 having received the request resets the authentication success flag 94. In block 293, the password authentication code 131 transmits a command, TSC_PhysicalPresenceNotPresent, to the security chip 26 to set the TPM_PhysicalPresence flag to negative and transmits a command, TSC_PhysicalPresenceLock, to make the TSC_PhysicalPresence flag not rewritable.

Although the OS starts booting in block 295, the security chip 26 does not permit the privilege command in the times ahead and does not accept the command TSC_PhysicalPresencePresent. The lock state of the TPM_PhysicalPresence flag is released whenever the laptop PC 10 is cold-started. Since the single sign-on is not allowed in blocks 297 to 301, the user enters the power-on password, the supervisor password, and the HDD password through the keyboard 47 in accordance with the request of the password authentication code 131 by means of the individual authentication. The physical ownership presence in the present invention may utilize, in lieu of the fingerprint authentication device 41, a biometric authentication device that uses other biometric information of, for example, hands, retina, iris, voice, and vein.

As has been described, the present invention provides a method for performing biometric authentication by a computer having a biometric authentication device.

It is also important to note that although the present invention has been described in the context of a computer system, those skilled in the art will appreciate that the method of the present invention is capable of being distributed as a computer program product via a computer readable medium such as a compact disc.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    placing a portable computer in an non-operating state, wherein said portable computer includes a start-up button, a proximity sensor, a biometric authentication device, a power supply unit containing a first power system and a second power system capable of having less power loss than said first power system in a light-load condition;
    deactivating said second power system so that electric power is supplied from said first power system to said biometric authentication device during said non-operating state of said portable computer;
    in response to said proximity sensor's detection of a person being proximate to said biometric authentication device, activating said second power system so that electric power is supplied from said second power system to said biometric authentication device during said non-operating state of said portable computer;
    performing an authentication operation while receiving electric power from said second power system during said non-operating state of said portable computer; and
    in response to said authentication operation being a success, starting up said portable computer by causing said portable computer to transition from said non-operating state to a power-on state.

2. The method of claim 1, wherein said starting up further includes generating a pseudo startup signal equivalent to a startup signal generated by a depression of said start-up button.

3. The method of claim 2, wherein said placing further includes transition said portable computer to a power-off (DC) state where it is possible to supply electric power to said portable computer solely by a battery.

4. The method of claim 1, wherein said activating is performed in a state of ensuring uninterrupted power supply by supplying electric power from any one of said first and said second power systems when switching from said first power system to said second power system.

5. The method of claim 3, wherein said method further includes sending a command that asserts physical presence to a security chip in response to the generation of said pseudo startup signal, during one of a hibernation state, a power-off (AC) state where electric power is supplied by an AC/DC adapter, and a power-off (DC) state where electric power is solely supplied by said battery.

6. The method of claim 5, wherein said method further includes sending a command that contradicts said physical presence to said security chip in response to the generation of said pseudo startup signal in a suspended state.

7. The method of claim 5, wherein said method further includes executing single sign-on with respect to a power-on password, a supervisor password, and a hard disk drive password in response to said sending command that asserts physical presence to said security chip.

8. The method of claim 1, wherein said method further includes displaying failure in said authentication in response an authentication failure.

9. A portable computer comprising:
    a processor;
    a proximity sensor;
    a power supply unit having a first power system and a second power system capable of having less power loss in a light-load condition than said first power system;
    a power control circuit for controlling said power supply unit;
    a start-up button for generating a startup signal for starting said portable computer; and
    a biometric authentication device for generating and sending a power request signal to said power control circuit to activate said second power system upon said proximity sensor's detection of a person being proximate to said biometric authentication device when said second power system is deactivated and electric power is being supplied by said first power system, wherein said biometric authentication device performs an authentication operation while receiving electric power from said second power system during a non-operating state of said portable wherein said power control circuit causes said portable computer to transition from said non-operating state to a power-on state in response to an authentication success by said biometric authentication device.

10. The portable computer of claim 9, wherein said biometric authentication device sends a pseudo startup signal to said power control circuit after said authentication success.

11. The portable computer of claim 9, wherein said portable computer transitions to a power-off (DC) state where it is supplied with electric power solely by said battery when said biometric authentication device detects a person swiping a finger on said biometric sensor in a state of being supplied with electric power from said first power system.

12. The portable computer of claim 9, wherein said first power system is configured by a linear regulator, and said second power system is configured by a switching regulator.

13. The portable computer of claim 9, further comprising a switching circuit for switching power source of said biometric authentication device from said first power system to said second power system.

14. The portable computer of claim 13, wherein said switching circuit is configured by a first FET is connected to said first power system and said biometric authentication device, a diode connected in parallel to said first FET, and a second FET connected to said second power system and said biometric authentication device.

15. The portable computer of claim 9, further comprising an indicator for displaying an authentication failure.

16. The portable computer of claim 10, further comprising a security chip; and
    a nonvolatile memory storing a CRTM authentication code, wherein said processor executes said CRTM authentication code before said pseudo startup signal is generated and an operating system sends a command that asserts physical presence to said security chip when said portable computer is being cold-started.

17. The portable computer of claim 16, wherein said processor permits a single sign-on with respect to a power-on password, a supervisor password, and a hard disk drive password when said command that asserts physical presence has been sent to said security chip.

18. The portable computer of claim 9, wherein said biometric authentication device is a fingerprint authentication device.

* * * * *